United States Patent [19]

Suda et al.

[11] 3,923,908

[45] Dec. 2, 1975

[54] PROCESS FOR THE PREPARATION OF HYDROQUINONE AND/OR RESORCINOL BY THE CLEAVAGE OF DIHYDROPEROXIDES

[75] Inventors: Hideaki Suda, Takaishi; Iwao Dohgane, Nishinomiya; Takashi Chinuki, Toyonaka; Kenji Tanimoto; Hirokazu Hosaka, both of Minoo; Yukimichi Nakao, Kobe; Yuji Ueda, Izumiotsu; Seiya Imada, Sakai; Hideki Yanagihara, Toyonaka; Kunihiko Tanaka, Ibaragi, all of Japan

[73] Assignee: Sumitomo Chemical Company, Limited, Osaka, Japan

[22] Filed: Oct. 31, 1973

[21] Appl. No.: 411,362

[30] Foreign Application Priority Data

Nov. 21, 1972 Japan............................. 47-117446

[52] U.S. Cl.......... 260/621 C; 260/592; 260/610 B; 260/618 C; 260/669 B

[51] Int. Cl.²......................................... C07C 37/08

[58] Field of Search..................... 260/621 A, 621 C

[56] References Cited

UNITED STATES PATENTS 2,785,205  3/1957  Jacobs ........................... 260/621 A

*Primary Examiner*—Norman Morgenstern
*Attorney, Agent, or Firm*—Stevens, Davis, Miller & Mosher

[57] ABSTRACT

Diisopropylbenzene dihydroperoxides are cleaved with an acid catalyst to produce resorcinol and/or hydroquinone by controlling the content of impurities in a cleavage feed solution of the dihydroperoxides to keep the ratio of the number of 2-hydroxy-2-propyl groups to the number of molecules of the dihydroperoxides, not more than 0.16. High cleavage yield can be obtained thereby.

2 Claims, 1 Drawing Figure

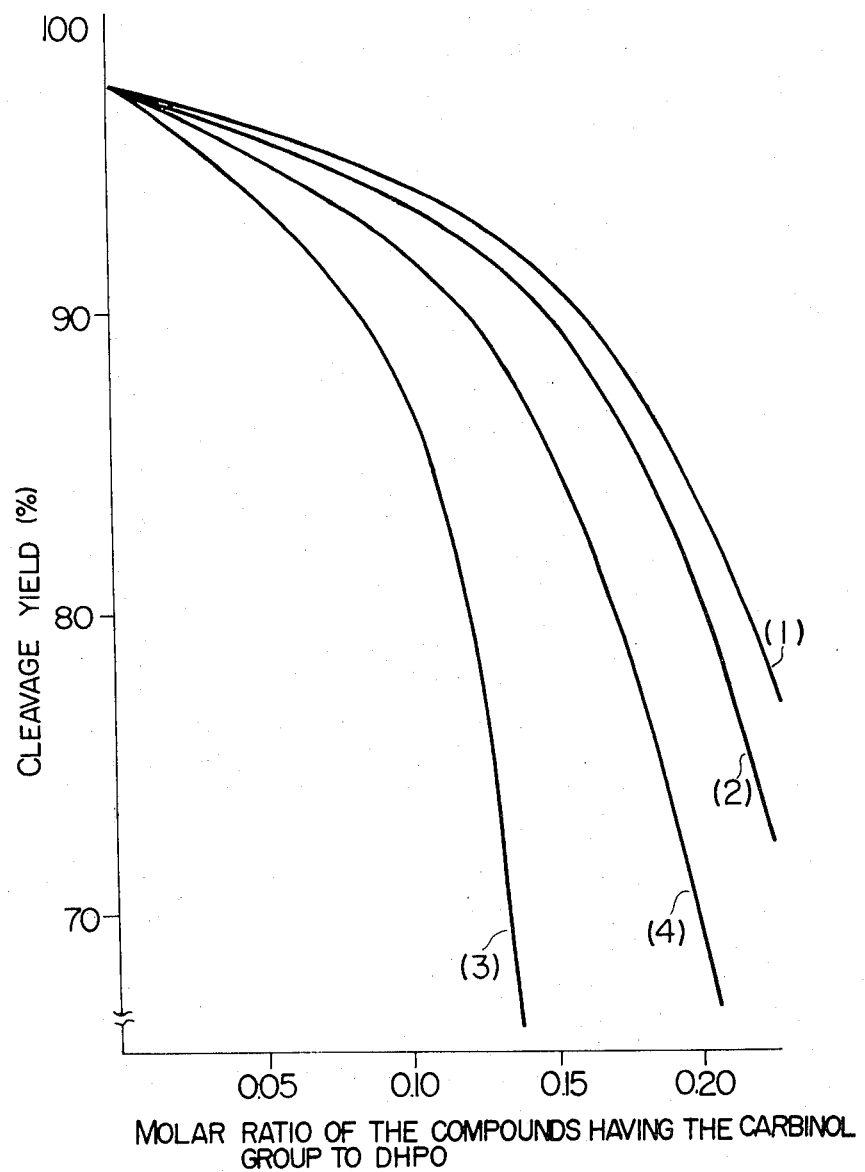

PROCESS FOR THE PREPARATION OF HYDROQUINONE AND/OR RESORCINOL BY THE CLEAVAGE OF DIHYDROPEROXIDES

This invention relates to a process for cleaving diisopropylbenzene dihydroperoxide (which will be hereinafter referred to as DHPO) with an acid catalyst, thereby producing resorcinol and/or hydroquinone in high yield.

It is known that an oxidation product solution containing DHPO is obtained by oxidation of diisopropylbenzene; DHPO is separated from the solution by extraction with an extracting reagent, for example, an aqueous alkaline solution; and DHPO is catalytically cleaved by an acid catalyst in the presence of an organic solvent, thereby producing resorcinol and/or hydroquinone.

It is also well known that resorcinol or hydroquinone is produced from meta- or paradiisopropylbenzene dihydroperoxide of high purity in high yield, for example, 95 % or more by the catalytic cleavage.

However, in these prior arts such high yield can be accomplished only when DHPO of high purity is used as the cleavage feed. In other words, resorcinol or hydroquinone is produced only in low yield when DHPO of low purity is cleaved.

To obtain resorcinol and/or hydroquinone almost quantitatively from DHPO, it is therefore necessary to increase the oxidation yield so high as to selectively obtain DHPO without occasioning side reactions almost at all, or to separate DHPO at a high purity after the oxidation reaction. However, it has been substantially difficult to effect any of these two procedures in an industrially as well as economically advantageous manner. Consequently, the low purity DHPO containing a considerable amount of impurities such as by-products formed in the oxidation reaction had to be subjected to the cleavage reaction, and as a result the cleavage yield has been very low under these situations.

On the other hands, the present inventors have already clarified that, when diisopropylbenzene is oxidized with molecular oxygen in the ordinary manner, the following oxidation by-products are formed in addition to the desired DHPO; that is, carbinols such as isopropylphenyldimethylcarbinol (which will be hereinafter referred to as MCA) and di-(2-hydroxy-2-propyl)-benzene (which will be hereinafter referred to as DCA); ketones such as acetylisopropylbenzene and diacetylbenzene; styrenes such as isopropylisopropenylbenzene and diisopropenylbenzene and various hydroperoxides such as (2-hydroxy-2-propyl)cumene hydroperoxide (which is a hydroperoxide containing a carbinol group and thus will be hereinafter referred to as CHPO) and acetylcumene hydroperoxide.

As a result of the studies on the adverse influence of the impurities contained in DHPO on the cleavage reaction, the present inventors have found that these by-products include not only the compounds having no direct relation to the cleavage yield of DHPO, but also the compounds having adverse influence upon the cleavage reaction, particularly those having 2-hydroxy-2-propyl group (which will be hereinafter referred to as carbinol group), and further that the content of the compounds having carbinol group is closely related to the cleavage yield, and have found that DHPO obtained from the oxidation product solution of diisopropylbenzene can be cleaved efficiently in a yield of at least 90 % by controlling the content of compounds having the carbinol groups.

Thus, the present invention provides a process for cleaving DHPO by contacting a cleavage feed solution of DHPO containing as impurities MCA, CHPO and DCA, with an acid catalyst to obtain resorcinol and/or hydroquinone, which comprises carrying out the cleavage reaction of DHPO by controlling the content of the impurities in the feed solution to keep the ratio of the number of carbinol groups to the number of molecules of DHPO not more than about 0.16.

In the present invention, the ratio of the number of carbinol groups to the number of molecules of DHPO is calculated by the following equation;

$$\text{the ratio} = \frac{\text{moles of MCA} + \text{moles of CHPO} + 2\times \text{moles of DCA}}{\text{moles of DHPO}}$$

The influence of the compounds having the carbinol group upon the cleavage reaction will be described in detail below by way of the accompanying drawing.

FIGURE shows relations between the cleavage yield (%) and the molar ratio of the compounds having the carbinol group to DHPO.

The cleavage of DHPO was carried out in the presence of said compounds having carbinol group to investigate influences of the compounds having carbinol group upon the cleavage yield of DHPO. That is, the cleavage of DHPO was carried out by adding to the cleavage feed solution various amounts of CHPO (the results are drawn by curve (1) in the FIGURE), MCA [curve (2) in the FIGURE], DCA [curve (3) in the FIGURE], and an equimolar mixture of these three components, that is, CHPO, MCA and DCA [curve (4) in the FIGURE].

In the FIGURE, the cleavage yield means a molar percent ratio of total of the formed resorcinol and hydroquinone to DHPO contained in the cleavage feed solution.

As is obvious from the FIGURE, the influence of the compound having the carbinol group upon the cleavage yield is never in proportion to the amount of the compound having the carbinol group added. That is, the cleavage yield is gradually lowered with an increase in the amount of the compound having the carbinol group in a range for a small amount of the compound added. However, in excess of some specific amount of the compound added, the cleavage yield is drastically lowered.

It is shown that the cleavage can be carried out in high cleavage yield such as about 90 % or more in a range less than specific content of the compound having the carbinol group, based on DHPO where the cleavage yield starts to undergo drastic lowering, that is, about 0.15 or less for CHPO and MCA, about 0.07 – 0.08 or less for DCA, and about 0.11 – 0.12 or less for the equimolar mixture of these three components.

From the above results and the fact that CHPO and MCA have one carbinol group per molecule and DCA has two carbinol groups per molecule, it is clear that the adverse influence on the cleavage reaction closely depends upon the ratio of the number of carbinol groups contained in the cleavage feed solution to the numbers of molecules of the dihydroperoxides (the said ratio being hereinafter referred to as the ratio of the carbinol group.)

The ratio of the carbinol group of CHPO or MCA will be equal to the ratio by mole of CHPO or MCA, that is, about 0.15, and the ratio of the carbinol group of DCA will be twice the ratio by mole of DCA, that is, about 0.14 – 0.16 In the case of the equimolar mixture of these three components, the number of carbinol groups will be in four based on the three molecules, and accordingly, when the mixture are about 0.11 – 0.12 by mole ratio, the ratio of the carbinol group will be about 0.15 – 0.16.

That is to say, the upper limit amounts of the compounds having the carbinol group added, that is, the amounts at which said drastic lowering of the cleavage yield starts to take place, are varied in terms of molar ratio of the compounds, but are constant, that is, about 0.14 – 0.16 in terms of the ratio of the carbinol group.

It is possible to remove the compounds having carbinol groups such as CHPO, MCA and DCA from the oxidation product solution containing DHPO according to a process already proposed by the present inventors, that is, a process for subjecting the oxidation product solution to extraction with ketones or alcohols and an aqueous alkaline solution.

More concretely speaking, the oxidation product solution containing DHPO and the compounds having carbinol groups is extracted with at lest one member of $C_4 - C_{10}$ ketones and $C_4 - C_8$ alcohols at a temperature of 0° to 50°C to separate into an organic layer containing the compounds having carbinol groups and an aqueous layer containing DHPO. The ketones include methylisobutylketone, methylethylketone, diisopropylketone and the like, and the alcohols include butanol, pentanol, octanol and the like. The organic layer separated may contain a small amount of DHPO and therefrom may be treated with an aqueous alkaline solution to recover DHPO. It is needless to say that another process for removing the compounds having carbinol groups can be applied for the present invention. Alternatively, DHPO isolated from another oxidation product solution may be added to make the ratio of the carbinol group not more than 0.16. The present invention has a great industrial and economical significance in clarifying that the compounds having the carbinol groups must be removed to less than a specific content and then the cleavage of DHPO can be very advantageously carried out.

Now, the present invention will be described in detail by way of examples, which are only illustrative, but not limitative. In the example, parts are by weight, and the value given in parentheses just after the "part" designation represent the ratio of the carbinol group.

EXAMPLE 1

A solution in 300 parts of acetone of 100 parts of DHPO, 4 parts [0.094] of DCA (mixture of meta- and paraisomers), 1 part [0.011] of CHPO [mixture of meta- and paraisomers], and 0.4 parts [0.005] of MCA (mixture of meta- and para-isomers), obtained by oxidation of diisopropylbenzene (a 60 : 40 mixture of meta- and para-isomers), and 50 parts of a 0.5 % sulfuric anhydride acetone solution are added to a glass reactor at the same time, and cleavage reaction is carried out, while keeping a reaction temperature at 60°C. The concentration of hydroperoxide remaining in the reactor reaches 0.1 % within 10 minutes including the time of dropwise addition, and at that time the solution is neutralized with an equivalent amount of NaOH (in aqueous 5 % solution) with respect to the sulfuric anhydride. The resulting sodium sulfate is filtered off, and 472 parts of a neutralized cleavage product solution containing 25.2 parts of resorcinol, 20.6 parts of hydroquinone, 3.2 parts in total of diisopropylbenzene, isopropenyl (2-hydroxy-2-propyl)benzene and DCA, 0.4 parts of isopropenylphenol, 0.2 parts of 2-hydroxy-2-propylphenol, and 0.2 parts in total of isopropenylbenzene and MCA is obtained.

The ratio of the carbinol group is 0.11 at that time. Yield of resorcinol and hydroquinone from DHPO is 94.0 %.

EXAMPLE 2

A solution in 300 parts of acetone of 100 parts of DHPO (the same mixture of meta- and paraisomers as in Example 1), 1 part [0.024] of DCA, 10 parts [0.108] of CHPO and 1 part [0.013] of MCA is subjected to cleavage with a sulfuric anhydride acetone solution, and then neutralized in the same manner as in Example 1. The resulting neutralized cleavage product solution contains 25.0 parts of resorcinol, 20.5 parts of hydroquinone, 0.4 parts in total of diisopropylbenzene, isopropenyl (2-hydroxy-2-propyl)benzene and DCA, 2.5 parts of isopropenylphenol, 2.0 parts of (2-hydroxy-2-propyl) pehenol and 0.6 parts in total of isopropenylbenzene and MCA. Yield of resorcinol and hydroquinone is 93.5 % at that time. The ratio of the carbinol group is 0.145 at that time.

EXAMPLE 3

A solution consisting of 100 parts of meta- DHPO, 1 part [0.024] of meta-DCA, 100 parts [0.108] of meta-CHPO and 1 part [0.013] of meta-MCA, obtained by oxidation of metadiisopropylbenzene, is dissolved in 300 parts of acetone, and subjected to cleavage with 50 parts of a 0.1 % perchloric acid acetone solution as a catalyst. The cleavage conditions are the same as in Example 1. The cleavage product solution is neutralized with powdery $Na_2CO_3$, and solid matters are filtered off. 460 parts of a cleavage product solution containing 44.8 parts of resorcinol, 0.6 parts in total of diisopropylbenzene, isopropenyl (2-hydroxy-2-propyl)benzene, and DCA, 2.0 parts of isopropenylphenol, 2.0 parts of (2-hydroxy-2-propyl) phenol and 0.6 parts in total of isopropenylbenzene and MCA is obtained. Yield of resorcinol from DHPO is 92.0 %. The ratio of the carbinol group is 0.145 at that time.

REFERENCE EXAMPLE 414.5 parts of an acetone solution (acetone: 300 parts) containing 100 parts of DHPO (the same mixture of meta- and para-isomers as in Example 1), 12 parts [0.28] of DCA, 2 parts [0.022] of CHPO, and 0.5 parts [0.006] of MCA is cleaved with 50 parts of a 0.5 % sulfuric anhydride acetone solution as a catalyst, and neutralized, after the cleavage, in the same manner as in Example 1.

As a result, 470 parts of a netutralized cleavage product solution containing 19.0 parts of resorcinol, 17.5 parts of hydroquinone, 7.0 parts in total of diisopropenylbenzene, isopropenyl (2-hydroxy- 2-propyl) benzene and DCA, 0.6 parts of isopropenylphenol, 0.3 parts of (2-hydroxy-2-propyl)phenol, and 0.3 parts in total of isopropenylbenzene and MCA is obtained.

Yield of resorcinol and hydroquinone from DHPO is 75.0 %. The ratio of the carbinol group is 0.308 at that time.

What is claimed is:

1. In a process for cleaving diisopropylbenzene dihydroperoxides by contacting a cleavage feed solution of the dihydroperoxides referred to as DHPO containing as impurities isopropylphenyldimethylcarbinol referred to as MCA, (2-hydroxy-2-propyl) cumene hydroperoxide referred to as CHPO and di-(2-hydroxy-2-propyl)-benzene referred to as DCA, with an acid catalyst to obtain resorcinol and/or hydroquinone, the improvement which comprises carrying out the cleavage reaction of the dihydroperoxides by controlling the content of the impurities in the said feed solution to keep the ratio of the number of 2-hydroxy-2-propyl groups to the number of molecules of the dihydroperoxides as expressed by the equation the ratio = moles of MCA + moles of CHPO + 2 × moles of DCA/moles of DHPO to a value of not more than about 0.16.

2. In a process for cleaving diisopropylbenzene dihydroperoxides by contacting a cleavage feed solution of the dihydroperoxides referred to as DHPO containing as impurities isopropylphenyldimethylcarbinol referred to as MCA, (2-hydroxy-2-propyl) cumene hydroperoxide referred to as CHPO and di(2-hydroxy-2-propyl)-benzene referred to as DCA, with an acid catalyst to obtain resorcinol and/or hydroquinone, the improvement which comprises using a cleavage feed solution of the dihydroperoxides having the ratio of the number 2-hydroxy-2-propyl groups to the number of molecules of the dihydroperoxides as expressed by the equation the ratio = moles of MCA + moles of CHPO + 2 × moles of DCA/moles of DHPO to a value of not more than about 0.16.

* * * * *